(12) United States Patent
Grenchus, Jr. et al.

(10) Patent No.: US 7,054,824 B1
(45) Date of Patent: May 30, 2006

(54) METHOD OF DEMANUFACTURING A PRODUCT

(75) Inventors: Edward J. Grenchus, Jr., Vestal, NY (US); Robert A. Keene, Endicott, NY (US); Charles R. Nobs, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 09/524,366

(22) Filed: Mar. 14, 2000

(51) Int. Cl.
*G06F 17/60* (2006.01)

(52) U.S. Cl. ....................................................... 705/7
(58) Field of Classification Search ................ 705/7, 705/36, 8, 10; 364/401; 395/237; 228/264
See application file for complete search history.

(56) References Cited

U.S. PATENT DOCUMENTS

| | | | | |
|---|---|---|---|---|
| 4,488,463 | A | * | 12/1984 | Pontarella ....................... 83/13 |
| 5,080,291 | A | * | 1/1992 | Bloom ........................... 241/19 |
| 5,148,969 | A | * | 9/1992 | Boucher et al. ............. 156/584 |
| 5,532,928 | A | * | 7/1996 | Stanczyk et al. ............... 705/7 |
| 5,699,525 | A | * | 12/1997 | Embutsu et al. ................ 705/7 |
| 5,802,501 | A | * | 9/1998 | Graff ............................. 705/36 |
| 5,948,137 | A | * | 9/1999 | Pflaum ........................ 266/100 |
| 5,950,936 | A | | 9/1999 | Bergart ......................... 241/21 |
| 5,965,858 | A | * | 10/1999 | Suzuki et al. ................ 209/630 |
| 6,192,347 | B1 | * | 2/2001 | Graff ............................. 705/36 |
| 6,305,548 | B1 | * | 10/2001 | Sato et al. .................... 209/3.3 |

FOREIGN PATENT DOCUMENTS

JP 11165160 6/1999

OTHER PUBLICATIONS

Microsoft Computer Dictionary, 1997, Microsoft Press, Third Edition.*
L. B. Jung, "The Conundrum of Computer Recycling," Resource Recycling Magazine, May 1999 6 p.
J. Stackhouse, "Global PC Growth Slips Back," Newsbytes News Network, Dec. 12, 1999, 1 p.
T. McCall, "Gartner Group's Dataquest Says European PC Industry Surpasses 23 Percent Growth in Third Quarter" Business Wire, Nov. 5, 1999, 2 p.
J. Markoff, "Compressed Data: The PC Industry Shows Strong Growth," The New York Times, Oct. 25, 1999, Section C, p. 4.
E. Grenchus, R. Keene, and C. Nobs, "Demanufacturing of Information Technology Equipment" Proc. 1997 IEEE Int. Synp. on Electronics and the Environment, San Francisco, CA May 1997, pp. 157-160.

(Continued)

*Primary Examiner*—Susanna M. Diaz
*Assistant Examiner*—Peter Choi
(74) *Attorney, Agent, or Firm*—John R. Pivnichny; William E. Schiesser; Jack P. Friedman

(57) ABSTRACT

Obsolete and unwanted computer and other products are demanufactured according to a method of recovering the largest revenue. An optimum level of disassembly and parts removal is determined based on strategies involving outright sale, sale of parts, disassembly costs, and commodity recovery. Critical parts are identified and regulatory requirements are included.

8 Claims, 3 Drawing Sheets

OTHER PUBLICATIONS

E. Grenchus, "Overview of IBM's Demanufacturing Process," The Demanufacturing of Electronic Equipment Conf., EIA and other sponsors, Deerfield Beach, FL, Oct. 1997, 7 p.

E. Grenchus et al., Linking demanufacturing operations with product DFE initiatives, Proc. IEEE Int. Symp. on Electronics and the Environment, Oak Brook, IL, May 4-6, 1998 pp. 270-274.

E. Grenchus, R. Keene, and C. Nobs, "Process of Demanufacturing Computer Equipment as Practiced at IBM's Asset Recovery Center," Industrial Engineering SOLUTIONS '98 Conf. Proc. Banff, Alberta, Canada, May 1998, pp. 62-67.

E. Grenchus, "Computers: Reuse and Recycling," handout presented at Annual Recycling Conf. and Vendor Exposition, Federation of New York Solid Waste Assoc, and other sponsors, Syracuse, NY, Oct. 5 & 6, 1998. 14 p.

E. Grenchus et al, "A Pragmatic Approach to Demanufacturing Information Technology Equipment," The Demanufacturing of Electronic Equipment Conference, Southern Waste Information Exchange and other sponsors, Deerfield Beach, FL, Oct. 28-30, 1998, 4 p.

M. Dunnett et al., "Evaluation of IBM End of Life Products: Measuring DFE Effectiveness," Proc. 1999 IEEE Intl. Symp. on Electronics and the Environment, May 11-13, 1999, pp. 98-103.

C. Boswell, "A Feedback Strategy for a closed loop end-of-life cycle process," IEEE and IEE Intl. Conf. on Clean Electronics Products & Technology, Edinburgh, Scotland, Oct. 9-11, 1995, pp. 142-147.

B. Lee and K. Ishii, Demanufacturing Complexity Metrics in Design For Recyclability, IEEE Intl. Symp. on Electronics and the Environment, San Francisco, CA, May 5-7, 1997, pp. 19-24.

E. Hirasawa, "A Recycling Plant for Home Electric Appliances," Mitsubishi Electric ADVANCE, Technical Report, Sep. 1999, vol. 87 pp. 7-11, (Japan).

* cited by examiner

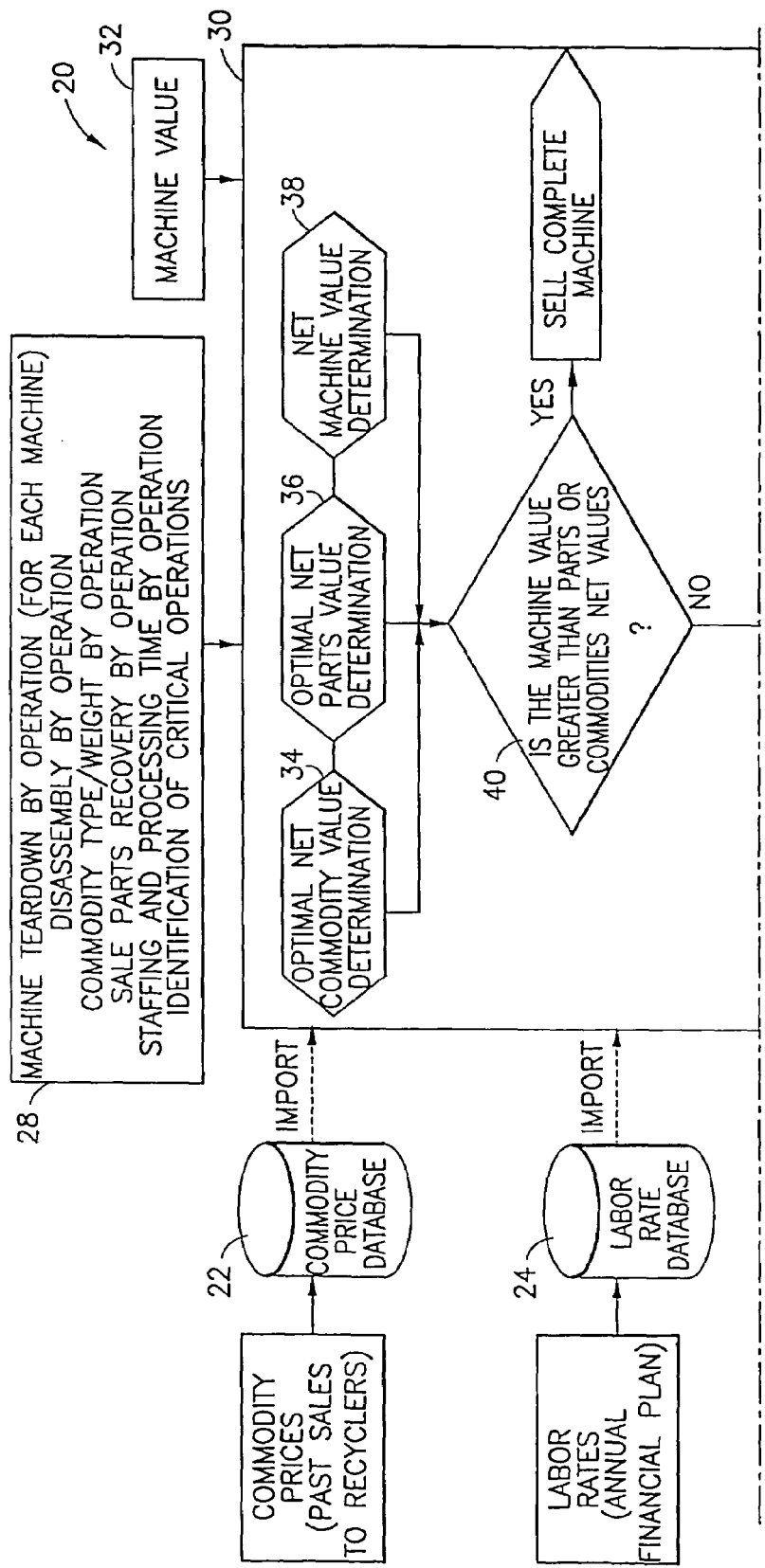

METHOD OF DEMANUFACTURING A PRODUCT

TECHNICAL FIELD

The invention relates to a method and business process for demanufacturing a product. In particular, the invention relates to determining the amount of effort to expend in disassembly of a product to provide the greatest economic benefit in recycling the product itself, its parts, and its basic commodity materials.

BACKGROUND OF THE INVENTION

Recycling of obsolete and unwanted products provides benefits over alternatives such as disposal in landfills or incineration. Such recycling benefits individuals, companies, and society both financially and by reducing the impact of disposal on the environment. Although applicable to most manufactured products, recycling is of particular interest for information technology products such as personal computers, displays, printers and associated devices because of the ever shortening life cycle before obsolescence of such products.

Individual owners as well as companies need to dispose of this obsolete and unwanted equipment. It is typically shipped or delivered to a recycling point operated by a company engaged in the recycling business. Grenchus, Keene, and Nobs describe some aspects of such a recycling business in "Demanufacturing of Information Technology Equipment," published in the Proceedings of the 1997 IEEE International Symposium on Electronics and the Environment, pages 157–160, May 1997 in San Francisco, Calif. Further descriptions can be found in Grenchus, "Overview of IBM's Demanufacturing Process," presented at the Demanufacturing of Electronic Equipment Conference, October 1997, Deerfield Beach, Fla. and by Grenchus et al. in "Process of Demanufacturing Computer Equipment at IBM's Asset Recovery Center," published in the conference proceedings of the '98 Industrial Engineering SOLUTIONS conference held May 1998 in Banff, Alberta, Canada pages 62–67. The three proceeding documents are incorporated herein by reference.

Upon receipt at a recycling point, the product may be re-sold perhaps with some minimal testing of operability etc. It may be wholly or partially disassembled to remove parts if any, which have a resale value. The remaining product is then typically separated into basic materials such as plastics, precious metals, copper, steel, glass etc, to be sold for their commodity value. The recycling process is performed rapidly because large numbers of products must be handled in order to achieve economics of scale with products which have little or no value individually.

Masato in Japanese patent JP11165160A describes a system for dismantling which involves a merchandise code stuck on the surface of an apparatus. The code is read with an optical reader, and information necessary for dismantling is obtained from an information center where the information was previously accumulated. Use of the code therefore saves time and labor in the disassembly and dismantling.

Bergart in U.S. Pat. No. 5,950,936 describes a system and method for processing waste glass which may be used for the glass commodity noted above.

Boswell in "A Feedback Strategy for a Closed Loop End-of-Life Cycle Process," presented at the IEE/IEEE International Conference on Clean Electronics Products and Technology, Edinburgh, UK, Oct. 9–11, 1995 describes a process for gathering data during de-manufacturing to feed back to product designers. The product designers can then use this input information to design products, including e.g. material selections, so that the products generate the best economic return during recycling at some future time. Although this feedback to designers process is of some benefit, it is based upon todays' economics to estimate what may or may not apply to recycling economics at a future time.

Jung in "The Conundrum of Computer Recycling" published in Resource Recycling Magazine, May 1999 points out that equipment recyclers must make constant decisions about the level of dismantling and material separation to pursue. This effort requires constant attention and employee retraining. Because of the high costs involved, Jung recommends a strategy of extending the life of existing equipment through upgrading and developing a company program for effectively managing end-of-life equipment.

Because of the rapid obsolence of products with a corresponding rapid change in product and part resale prices, a method and system of dismantling which can be rapidly determined using current resale, commodity and labor prices at the time a product arrives at the recycling point, is therefore needed. It is believed that such a method and system would constitute a significant improvement in the demanufacturing art.

OBJECTS AND SUMMARY OF THE INVENTION

It is therefore a principal object of the present invention to enhance the demanufacturing art by providing a method of demanufacturing a product with enhanced capabilities.

It is another object to provide a demanfacturing process capable of effectively managing obsolete and unwanted products by rapidly determining the optimum level of disassembly to employ.

It is a further object to provide a method of determining the optimum level of demanufacturing a product using current price data stored in a database and a spreadsheet model.

It is yet another object to provide a system for optimally determining in a facile manner the extent to demanufacture a product having a plurality of parts.

These and other objects are attained in accordance with one embodiment of the invention wherein there is provided a method of demanufacturing a product, comprising the steps of, providing a product for demanufacturing, the product having a plurality of parts, wherein each of the parts comprises one or more commodities, collecting a resale price for the product, collecting one or more resale prices for one or more of the parts respectively, collecting one or more commodity prices for one or more of the commodities respectively, determining the labor expense to remove each of the parts from the product, entering the resale prices, the commodity prices, and the labor expense into a computer model, executing the computer model to make a determination of which of the parts to be removed from the product, and in response to the determination, either offering the product for resale, or removing the parts which were determined to be removed, if any, and offering the parts for resale, and separating any remaining parts of the product into the commodities, and offering the commodities for resale.

In accordance with another embodiment of the invention, there is provided a method of determining the extent to demanufacture a product, comprising the steps of, providing a product for demanufacturing, the product having a plurality of parts, wherein each of the parts comprises one or more commodities, collecting a resale price for the product, collecting one or more resale prices for one or more of the parts respectively, collecting one or more commodity prices for one or more of the commodities respectively, determining the labor expense to remove each of the parts from the product, entering the resale prices, the commodity prices, and the labor expense into a spreadsheet model, and executing the spreadsheet model to decide which of the parts to remove from the product or whether to offer the product for resale.

BRIEF DESCRIPTION OF THE DRAWINGS

FIGS. 2A-2B is a flowchart illustrating the information flow and decision making steps of the present invention.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
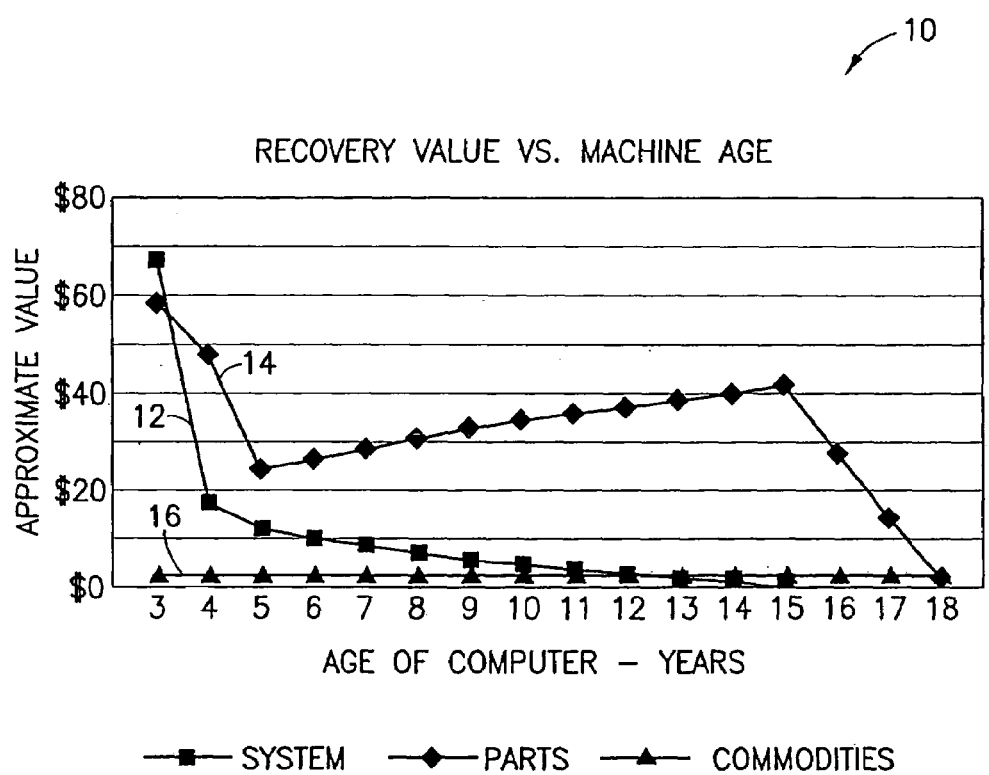
FIG. 1 illustrates in graphical form the change in recovery value of a particular product over time.

In FIG. 1 there is shown a time graph 10 representing the approximate recovery value of a product over its age in years. In the case of FIG. 1 the product is a particular personal computer processor unit and does not include the display, keyboard, printer, mouse, or other units which may be attached to the processor unit during normal use. The data lines shown in the graph are representative in that each particular product will normally have different specific data lines. Data line 12 depicts the sale price of the unit itself. As with most personal computers, the resale price drops rapidly during the first 3 years due to obsolescence and by year 4 has very little value.

Data line 14 depicts the recovery value of parts which can be removed from the processor unit and resold as parts. This value also drops rapidly, reaches a dip at year 5 and then gradually increases reflecting a market demand for parts that are no longer manufactured, but are still in demand to support systems still in service. Eventually another rapid decrease in value occurs as the remainder of these systems are removed from service. Data line 16 shows the recovery value of the basic materials obtained through commodity recycling and reclamation efforts. At the present time it appears that older machines have a greater commodity recovery value. This may be attributed to a higher weight and therefore a greater amount of material for recovery. Older machines also tend to have more precious metal content for recovery than newer machines.

Commodity recovery is used throughout industry in order to separate products into unique materials such as steel, aluminum, copper, precious metals, and various plastics. A product is typically shredded into small pieces. The size of the pieces may vary by product but can be so small as to form a powdery material. The shredded material is then separated into commodities such as iron, non ferrous metals, precious metals, and plastics through separating processes involving magnetism, eddy currents, water, air jets etc. Such separating processes are well known and further explanation is not necessary. The product may also be separated through full or partial manual disassembly. Hazardous materials are also removed either before or during the commodity recovery process in accordance with regulatory requirements.

It can be readily seen from FIG. 1 that the three data lines may cross multiple times so that for a particular returned machine, a strategy of obtaining the highest recovery value will depend on the age of that particular machine.

Recovery value above is not the only factor to consider when determining the best demanufacturing level. The cost of part removal and material separation must also be determined. As noted above, Jung recommended a system be developed to effectively manage this problem of determining the best strategy of dismantling and material separation to pursue.

Figure 2B:
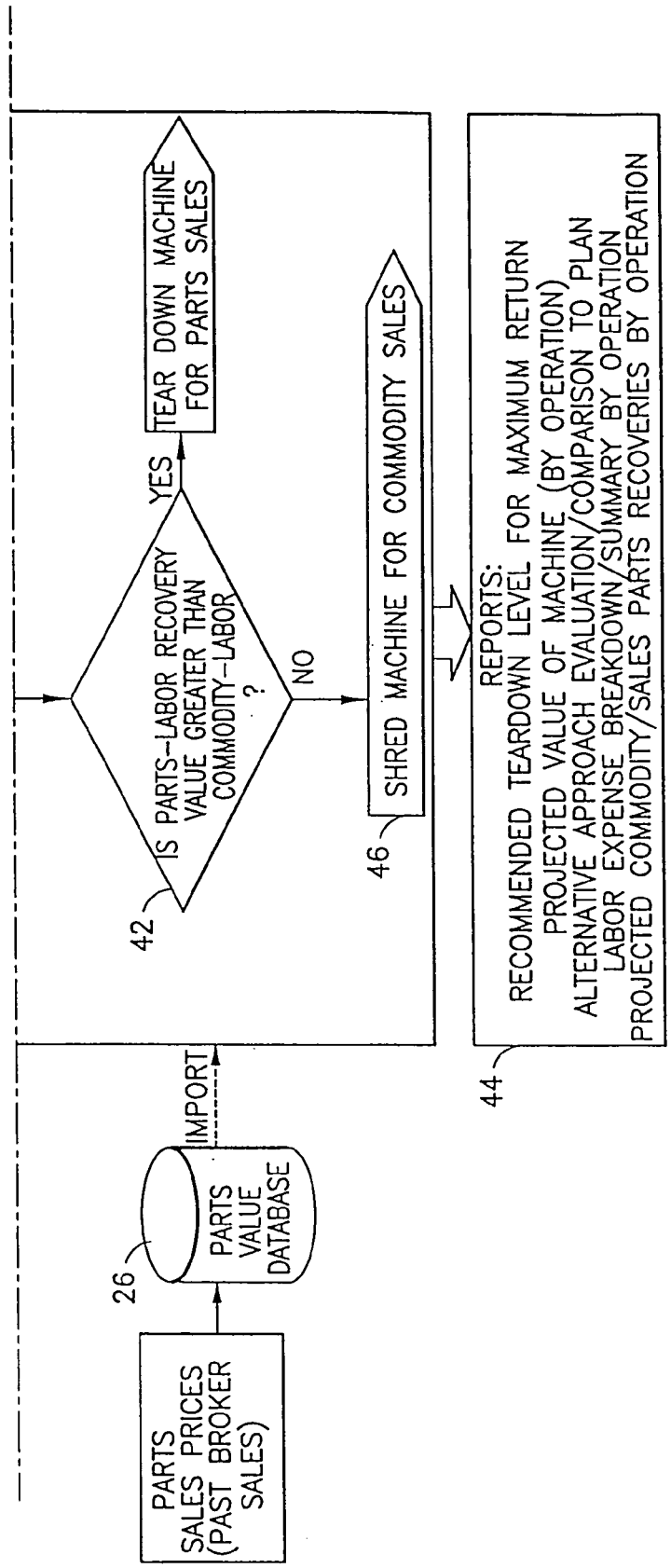

In FIGS. 2A-2B there is shown a flowchart 20 of a process for performing such determinations and handling the product demanufacturing. Prices for commodity materials are entered in commodity price database 22. This database as well as all databases to be subsequently described may be any type of data storage apparatus but is preferably an on-line data file on a harddrive of a computer system. The data may be stored using any database system or any other system such as a spreadsheet or specially designed software for storing the commodity price data. Commodity prices are frequently updated to reflect changes in commodity prices over time. One source of commodity prices is the price of past sales to recycling companies. Price quotations can also be used as well as any other reliable source of commodity prices.

Labor rates are entered in labor rate database 24. Because labor rates tend to change less frequently than commodity prices, the labor rates do not need to be updated as frequently. However, the frequency of updating each database can be independently adjusted to insure the data stored in a database is current. One source of labor rates may be an annual financial plan made by the demanufacturing company which will perform the dismantling and removal of parts from a product.

Parts values are stored in parts value database 26. A source of parts values may be recent sale prices to parts brokers. Other sources such as quotations, or advertized prices may also be used. Parts values are also frequently updated to insure the data in database 26 is current. It will be obvious to those skilled in the art that databases 22,24, and 26 may be combined into a single database having for example three sets of data. Other combinations are possible without departing from the scope of the invention.

In one embodiment of the invention, commodity database 22 and parts value database 26 are updated monthly and labor rate database is updated annually.

In step 28, information on disassembly of a product is entered into a demanufacturing model 30. Demanufacturing for each product is separated into a series of one or more operations based on logical points to stop disassembly. For example if the product is a personal computer, the first operation may be to remove 8 retaining screws and a cover. It would not be logical to stop after removing just 4 screws because the commodity price or parts price of the screws would be insignificant. However after removing the cover, a major plastic part is separated which may increase the commodity value of the remainder by separating out the plastic. Or it may be more logical to remove all plastic parts and then stop. Such logical decisions can be easily made by experience individuals based on the characteristics of each individual product type without undue concern with value because the model will determine which stopping point is best.

The following information is entered in step 28 for a product: disassembly level for each operation, commodity type e.g. copper, steel, plastic and weight removed during each operation, salable parts recovered during each operation, labor time required to perform each operation. In addition critical operations may optionally be defined in step 22. Examples of critical operations may be: removal of sensitive parts to prevent disclosure of confidential or trade secret information, recovery of parts needed to satisfy a shortage requirement (usually temporary) for build of other products, removal of parts to prevent their re-use, removal of parts or materials as required by a vendor commodity purchaser—e.g. all plastic must be removed, or removal of hazardous materials as required by regulatory agencies. There may be other reasons or examples of defining optional critical operations.

In step 32, the value of the product, if sold outright is entered into the demanufacturing model.

Once all of the required data is entered, the model is executed to determine the optimal level of demanufacturing. In step 34 the level of demanufacturing which results in the highest commodity value is determined irrespective of the parts or whole product value. In step 36 the level of demanufacturing resulting in the highest removed parts value is determined regardless of commodity or whole product values. In step 38 the value of selling the whole product is determined. This may be merely the value entered in step 32 or may include other factors relating to such a sale.

In step 40, if the whole product value is greater than both the highest commodity and highest parts value, then a determination is made to sell the whole product. In step 42, further comparisons are made for each level of demanufacturing to determine which level results in the greatest difference between parts minus part removal labor and commodities minus commodity labor.

In step 46, the remaining level of the machine is determined to be separated and sold as commodities or sold to a commodity dealer who will also perform the separation.

Regardless of the determinations made in steps 40, 42 and 46, if critical operations are defined as noted above, then model can be adapted to cause such critical operations to override such determinations before proceeding with the type of determination made in steps 40, 42, and 46. Sequences and steps other than the embodiment just described may be used for level determination without departing from the scope of invention.

Model 30 generates in step 44 a report listing the recommended demanufacturing level and maximum return value. Other optional reports may also be generated such as the value by operation or at each demanufacturing level, comparison of such value to a plan, a labor expense breakdown or summary by operation, and projected commodity and sales parts by operation.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method for optimally demanufacturing an electronic product to recover a largest revenue, said method comprising:

providing said electronic product for demanufacturing, said electronic product having a plurality of parts, wherein each of said parts comprises one or more commodities;

collecting a resale price for said electronic product; collecting one or more resale prices for one or more of said parts respectively;

collecting one or more commodity prices for one or more of said commodities respectively;

determining if said electronic product contains hazardous materials, and if so, determining a hazardous materials handling expense;

determining a labor expense to remove said each of said parts from said electronic product;

entering said resale price for said electronic product, said one or more resale prices for said one or more parts, said one or more commodity prices, said labor expense, and said hazardous materials handling expense, if any, into a computer model;

executing said computer model to determine a highest commodity value irrespective of said one or more resale prices for one or more of said parts, or said resale price for said electronic product;

executing said computer model to determine a highest removed parts value irrespective of said one or more commodity prices for one or more of said commodities, or said resale price for said electronic product;

executing said computer model to make a determinations as to which of said resale price for said electronic product, said highest removed parts value less said labor expense, and said highest commodity value is greater and which of said parts, if any, should be removed from said electronic product so as to recover said largest revenue; and in response to said determination, either offering said electronic product for resale, or removing said parts which were determined to be removed, if any, and offering said parts for resale, removing said hazardous materials, if any, separating any remaining parts into said commodities, and offering said commodities for resale.

2. The method of claim 1, wherein said resale prices, said commodity prices, said hazardous materials handling expense, and said labor expense are provided from a database, wherein said database is periodically updated.

3. The method of claim 1, wherein said computer model is a spreadsheet model.

4. A method for determining an optimal extent to demanufacture an electronic product to recover a largest revenue, said method comprising:

providing said electronic product for demanufacturing, said electronic product having a plurality of parts, wherein each of said parts comprises one or more commodities;

collecting one or more resale prices for one or more of said parts respectively;

collecting one or more commodity prices for one or more of said commodities respectively;

determining if said electronic product contains hazardous materials, and if so determining a hazardous materials handling expense;

determining a labor expense to remove said each of said parts from said electronic product;

entering said one or more resale prices, said one or more commodity prices, said labor expense, and said hazardous materials handling expense, if any, into a spreadsheet model;

executing said spreadsheet model to determine a highest commodity value irrespective of said one or more resale prices for one or more of said parts;

executing said spreadsheet model to determine a highest removed parts value irrespective of said one or more commodity prices for one or more of said commodities; and executing said spreadsheet model to optimally determine whether said highest removed parts value less said labor expense or said highest commodity value is greater and which of said parts, if any, to remove from said electronic product so as to recover said largest revenue.

5. A method for determining an optimal extent to demanufacture an electronic product recover a largest revenue, said method comprising:

providing said electronic product for demanufacturing, said electronic product having a plurality of parts, wherein each of said parts comprises one or more commodities;

collecting a resale price for said electronic product;

collecting one or more resale prices for one or more of said parts respectively;

collecting one or more commodity prices for one or more of said commodities respectively;

determining if said electronic product contains hazardous materials, and if so, determining a hazardous materials handling expense;

determining a labor expense to remove said each of said parts from said electronic product;

entering said resale price for said electronic product, said one or more resale prices for said one or more parts, said one or more commodity prices, said labor expense, and said hazardous materials handling expense, if any, into a spreadsheet model;

executing said spreadsheet model to determine a highest commodity value irrespective of said one or more resale prices for one or more of said parts, or said resale price for said electronic product;

executing said spreadsheet model to determine a highest removed parts value irrespective of said one or more commodity prices for one or more of said commodities, or said resale price for said electronic product; and executing said spreadsheet model to optimally determine which of said resale price for said electronic product, said highest removed parts value less said labor expense, and said highest commodity value is greater and which of said parts, if any, to remove from said electronic product, or whether to offer said electronic product for resale so as to recover said largest revenue.

6. A computer system for determining an optimal extent to demanufacture an electronic to recover a largest revenue, said electronic product having a plurality of parts wherein each of said parts comprises one or more commodities, said system comprising:

means for collecting one or more resale prices for one or more of said parts respectively;

means for collecting one or more commodity prices for one or more of said commodities respectively;

means for determining if said electronic product contains hazardous materials, and if so, determining a hazardous materials handling expense;

means for determining a labor expense to remove said each of said parts from said electronic product;

means for entering said one or more resale prices, said one or more commodity prices, said labor expense, and said hazardous materials handling expense, if any, into a spreadsheet model; means for executing said spreadsheet model to determine a highest commodity value irrespective of said one or more resale prices for one or more of said parts;

means for executing said spreadsheet model to determine a highest removed parts value irrespective of said one or more commodity prices for one or more of said commodities; and means for executing said spreadsheet model to optimally determine whether said highest removed parts value less said labor expense or said highest commodity value is greater and which of said parts, if any, to remove from said electronic product as to recover said largest revenue.

7. A computer program product for instructing a processor to determine an optimal extent to demanufacture an electronic product to recover a largest revenue, said electronic product having a plurality of parts, wherein each of said parts comprises one or more commodities, said computer program product comprising:

a computer readable medium;

first computer instruction means for collecting a resale price for said electronic product;

second computer instruction means for collecting one or more resale prices for one or more of said parts respectively;

third computer instruction means for collecting one or more commodity prices for one or more of said commodities respectively;

fourth computer instruction means for determining if said electronic product contains hazardous materials, and if so, determining a hazardous materials handling expense;

fifth computer instruction means for determining a labor expense to remove said each of laid parts from said electronic product;

sixth computer instruction means for entering said resale price for said electronic product, said one or more resale prices for said one or more parts, said one or more commodity prices, said labor expense, and said hazardous materials handling expense, if any, into a computer model;

seventh computer instruction means for executing said computer model to determine a highest commodity value irrespective of said one or more resale prices for one or more of said parts, or said resale price for said electronic product;

eighth computer instruction means for executing said computer model to determine a highest removed parts value less said labor expense irrespective of said one or more commodity prices for one or more of said commodities, or said resale price for said electronic product; and ninth computer instruction means for executing said computer model to make an optimal determination of whether to sell said electronic product, or whether to remove and sell one or more of said parts from said electronic product so as to recover said largest revenue; and wherein all of said computer instruction means are recorded on said medium.

8. The computer program product of claim 7, further comprising a database comprising said resale prices, said commodity prices, said hazardous materials handling expense, and said labor expense, and wherein said database is recorded on said medium.

* * * * *

UNITED STATES PATENT AND TRADEMARK OFFICE
CERTIFICATE OF CORRECTION

PATENT NO. : 7,054,824 B1
APPLICATION NO. : 09/524366
DATED : May 30, 2000
INVENTOR(S) : Edward J. Grenchus, Jr. et al.

It is certified that error appears in the above-identified patent and that said Letters Patent is hereby corrected as shown below:

In the Claims:

Column 6, Claim 1, line 24, change "determinations" to --determination--.

Column 7, Claim 5, line 12, change "product recover" to --product to recover--.

Column 7, Claim 6, line 49, change e"lectronic to recover" to --electronic product to recover--.

Column 8, Claim 7, line 33, change "laid parts" to --said parts--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,054,824 B1  
APPLICATION NO. : 09/524366  
DATED : May 30, 2006  
INVENTOR(S) : Edward J. Grenchus, Jr. et al.

Page 1 of 1

It is certified that error appears in the above-identified patent and that said Letters Patent is hereby corrected as shown below:

In the Claims:

Column 6, Claim 1, line 24, change "determinations" to --determination--.

Column 7, Claim 5, line 12, change "product recover" to --product to recover--.

Column 7, Claim 6, line 49, change e"lectronic to recover" to --electronic product to recover--.

Column 8, Claim 7, line 33, change "laid parts" to --said parts--.

This certificate supersedes Certificate of Correction issued March 6, 2007.

Signed and Sealed this

Third Day of April, 2007

JON W. DUDAS  
*Director of the United States Patent and Trademark Office*